United States Patent
Zahm et al.

(10) Patent No.: US 6,374,184 B1
(45) Date of Patent: Apr. 16, 2002

(54) METHODS AND APPARATUS FOR DETERMINING THAT A TRAIN HAS CHANGED PATHS

(75) Inventors: Charles L. Zahm, Indialantic; William L. Matheson, Palm Bay, both of FL (US)

(73) Assignee: GE-Harris Railway Electronics, LLC, Melbourne, FL (US)

(*) Notice: Subject to any disclaimer, the term of this patent is extended or adjusted under 35 U.S.C. 154(b) by 0 days.

(21) Appl. No.: 09/585,184

(22) Filed: Jun. 1, 2000

Related U.S. Application Data
(60) Provisional application No. 60/153,312, filed on Sep. 10, 1999.

(51) Int. Cl.[7] ............................. G01C 21/28; G01S 5/02
(52) U.S. Cl. ..................... 701/213; 701/207; 701/217
(58) Field of Search ............................... 701/213, 200, 701/205, 207, 216, 217, 208, 214

(56) References Cited

U.S. PATENT DOCUMENTS

| | | | | |
|---|---|---|---|---|
| 4,807,127 A | * | 2/1989 | Tenmoku et al. | 364/424.01 |
| 5,023,798 A | * | 6/1991 | Neukirchner et al. | 364/449 |
| 5,119,301 A | * | 6/1992 | Shimizu et al. | 364/450 |
| 5,170,165 A | * | 12/1992 | Iihoshi et al. | 340/995 |
| 5,311,173 A | * | 5/1994 | Komura et al. | 340/995 |
| 5,422,815 A | * | 6/1995 | Hijikata | 364/449 |
| 5,740,547 A | * | 4/1998 | Kull et al. | 701/19 |
| 5,774,824 A | * | 6/1998 | Streit et al. | 701/207 |
| 5,867,122 A | | 2/1999 | Zahm et al. | |
| 5,893,043 A | * | 4/1999 | Moehlenbrink et al. | 701/207 |
| 5,899,954 A | * | 5/1999 | Sato | 701/207 |
| 5,902,351 A | * | 5/1999 | Streit et al. | 701/220 |
| 5,986,547 A | * | 11/1999 | Korver et al. | 340/500 |
| 6,192,312 B1 | * | 2/2001 | Hummelsheim | 701/118 |
| 6,212,472 B1 | * | 4/2001 | Nonaka et al. | 701/208 |

FOREIGN PATENT DOCUMENTS

| | | |
|---|---|---|
| EP | 0 393 935 A | 10/1990 |
| WO | WO 95 30881 A | 11/1995 |

* cited by examiner

Primary Examiner—Michael J. Zanelli
Assistant Examiner—Eric M Gibson
(74) Attorney, Agent, or Firm—Carl A. Rowold'; Armstrong Teasdale LLP

(57) ABSTRACT

A path determination device is configured to receive measured heading and distance information; determine heading corrections, distance corrections, and residuals utilizing a Kalman filter assuming a selected, known path was taken; and to determine a probability that the selected, known path actually was taken utilizing the determined residuals. The additional information utilized by the Kalman filters provides a more robust measurement indication of whether a particular path is taken than mere measurements and correlations of path curvature.

27 Claims, 5 Drawing Sheets

METHODS AND APPARATUS FOR DETERMINING THAT A TRAIN HAS CHANGED PATHS

CROSS REFERENCE TO RELATED APPLICATIONS

This application claims the benefit of U.S. Provisional Application No. 60/153,312, filed Sep. 10, 1999, which is hereby incorporated by reference in its entirety.

BACKGROUND OF THE INVENTION

This invention relates generally to locomotive motion and location determination, and more particularly to methods and apparatus for determining, to a high level of certainty, that a train has changed from one path to another.

Known systems for determining whether a turnout has been taken require a GPS (global positioning satellite) receiver to measure path curvature. As used herein, a path includes a track, or a road. The measured path curvature is correlated to a known curvature of a particular turnout to determine whether the turnout was taken. This determination is difficult to perform and is not very robust. It would therefore be desirable to provide robust methods and apparatus for determining whether a turnout has been taken.

BRIEF SUMMARY OF THE INVENTION

There is therefore provided, in one embodiment, a path determination device configured to receive measured heading and distance information; determine heading corrections, distance corrections, and residuals utilizing at least one Kalman filter assuming a selected, known path was taken; and to determine a probability (prob) that the selected, known path actually was taken utilizing the determined residuals. The additional information utilized by the Kalman filters provides a more robust measurement indication of whether a particular path is taken than mere measurements and correlations of path curvature.

DETAILED DESCRIPTION OF THE INVENTION

Figure 1:
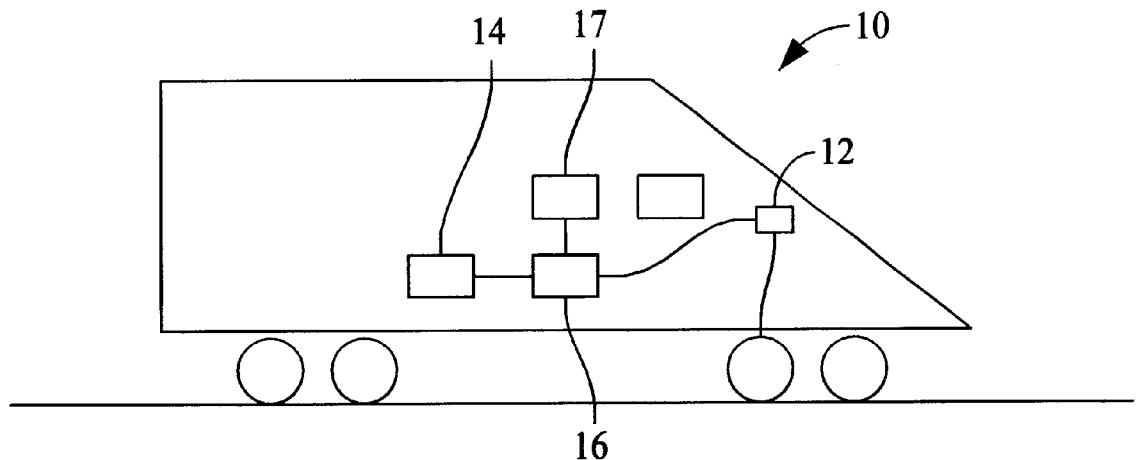
FIG. 1 is a schematic representation of a train having a distance measuring device and a heading or heading rate measuring device.

In one embodiment of the present invention, a path determination device uses a Kalman filter to resolve a statistical hypothesis test as to which of a plurality of paths a train is on after passing a turnout. Referring to FIG. 1, a vehicle 10, for example a train, is provided with a distance measuring device 12 such as an odometer (not shown) and a heading and/or heading rate measuring device 14 such as a gyroscope. A processor 16 is also provided for computational purposes and to access a path database 17 that provides heading as a function of distance on a path and switch locations for all path segments.

Figure 2:
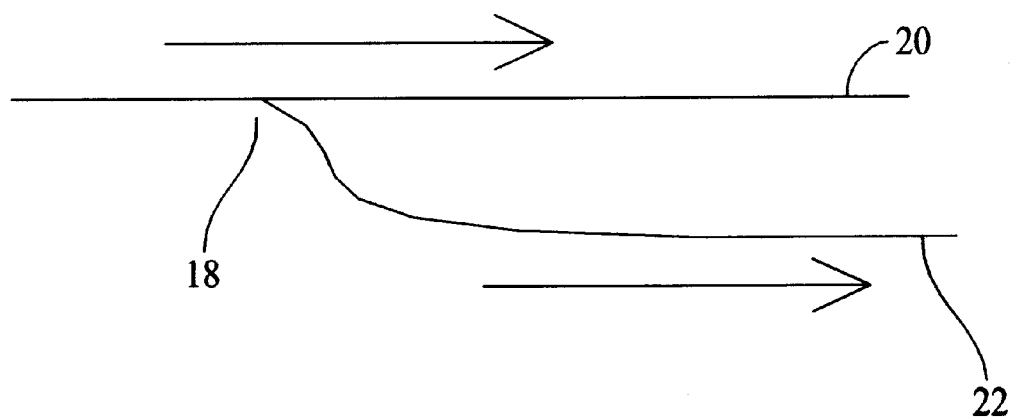
FIG. 2 is a representation of a typical turnout.

As an example of a hypothesis formulation and resolution, consider a case in which train 10 approaches a typical turnout 18 represented in FIG. 2. The hypothesis to be resolved is whether train 10 continued on path 20. If not, in the turnout represented in FIG. 2, the alternative is that train 10 took path 22 via turnout 18. Path database 17 contains both a location of turnout 18 and heading as a function of distance along both path 20 and path 22 from some suitable or selected origin. As an example, database 17 might contain information that from a defined origin, a location on path 20 after turnout 18 is 2000 meters away at 195 degrees. Similarly, a location on path 22 after turnout 18 is 2000 meters away at 198 degrees from the same defined origin.

To resolve the hypothesis, two Kalman filters (not shown in FIG. 2) are used, one for each path, to generate corrections for both distance and heading measurement. In addition, each Kalman filter provides measurement residuals associated with its assumed path. As known to those skilled in the art, residuals associated with a filter that assumes an incorrect path will grow much larger than residuals associated with a filter that assumes a correct path. This behavior of the Kalman filters permits a correct path determination to be made.

Figure 3:
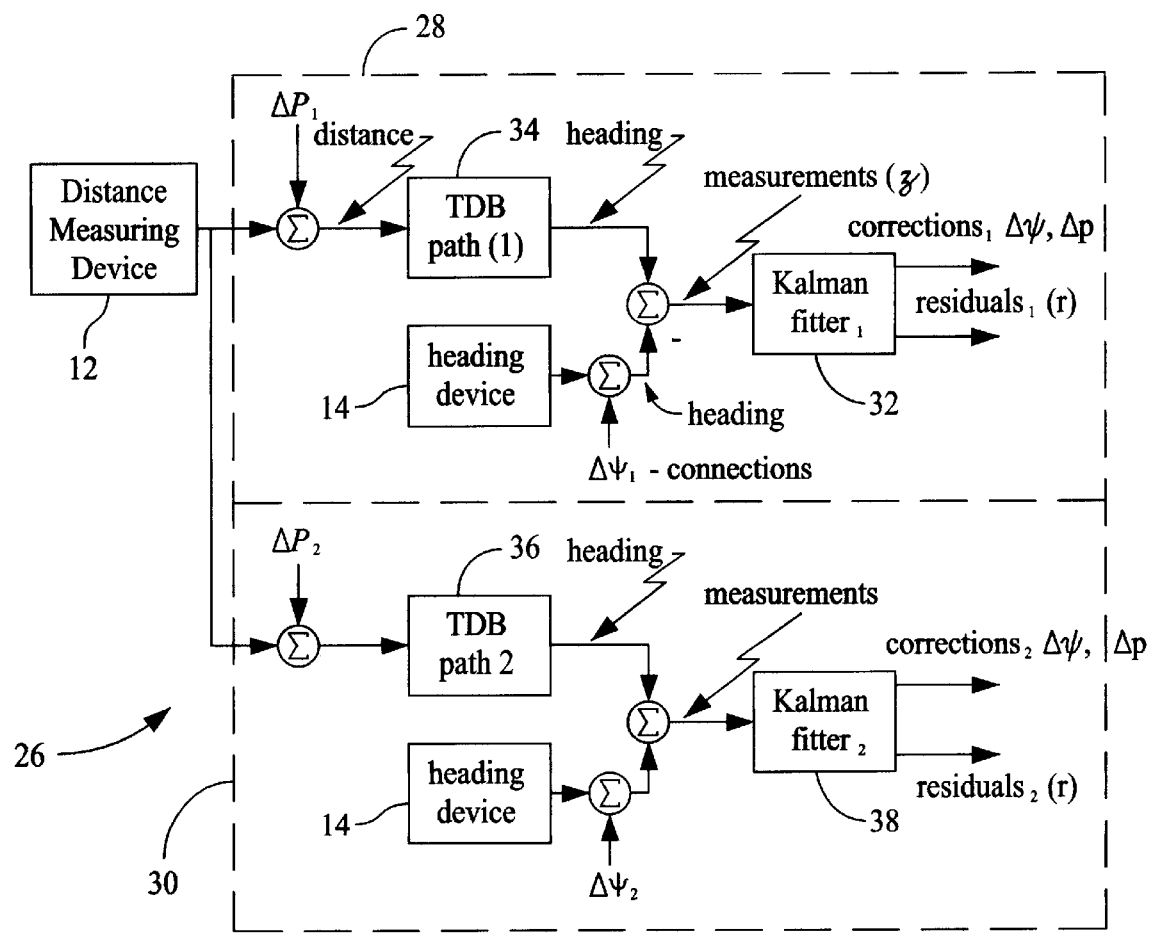
FIG. 3 is a block diagram of an embodiment of a path determining device of the present invention utilizing heading and distance information.

FIG. 3 is a block diagram of an embodiment of path determining device 26 utilizing heading and distance information. Distance measuring device 12 provides input to a first path hypothesis testing portion 28 configured to assume train 10 has followed path 20 and a second path hypothesis testing portion 30 configured to assume train 10 has followed path 22. Because both path hypothesis testing portions 28 and 30 are similarly configured and operate using the same inputs, it will suffice to explain only path hypothesis testing portion 28 in detail. Distance measuring device 12 receives values of measured distance along a traveled path, whether along path 20 or path 22. These distances are corrected with an input value $\Delta P_1$, a correction computed by Kalman filter 32. A resulting corrected distance is used to determine a heading from a path database 34, which contains heading data as a function of distance for path 20. (Hypothesis testing portion 30 contains a similar database 36 containing heading data as a function of distance for path 22.) A difference is computed between a heading read from path database 34 and a heading obtained by heading measuring device 14 after a correction $\Delta \psi$ from Kalman filter 32 is applied. This heading difference is applied to Kalman filter 32, where corrections $\Delta P_1$ and $\Delta \psi$ for a subsequent measurement are determined. In addition, residuals $r_1$ are determined. Path hypothesis testing portion 30 operates in a similar manner, but produces residuals $r_2$ from Kalman filter 38 using the assumption that the train is on path 22.

Given residuals $r_1$ and $r_2$ from Kalman filter 32 and Kalman filter 38, probabilities are computed that path 1 (i.e., path 20) has been taken and that path 2 (i.e., path 22) has been taken. For switch 18 represented in FIG. 2, these probabilities must sum to unity. The test statistic used in one embodiment to determine which path is the most probable is computed as follows.

Let $p_1(t)$=probability{path 1 is true$|z(t_1)=z_i$} where $z_i$ is the measurement vector, i.e., $z_i=[\Delta \psi(t_i)]$, and $\Delta \psi$ is the heading error. If a GPS receiver configuration is used, $z_i$ has pseudorange errors added in addition to heading errors, i.e., $z_i=[\Delta\psi_1\ \Delta p_1\ \Delta p_2\ \ldots\ \Delta p_n](t_i)$.

$p_j(t_i)$ is then written:

$$p_j(t_i) = \frac{p(z_i \mid \text{path } 1, z_{i-1})p_j(t_{i-1})}{p(z_i \mid \text{path } 1, z_{i-1})p_1(t_{i-1}) + p(z_i \mid \text{path } 2, z_{i-1})p_2(t_{i-1})}, \ j = 1, 2$$

where path 1 and path 2 correspond to paths 20 and 22, respectively, and $$p(z_i \mid \text{path 1 is true}, z_{i-1}) = \frac{1}{(2\pi)^{n/2}[\det(S_1(t_i))]^{1/2}} \exp\left[-\frac{1}{2} r_1^T S_1^{-1}(t_i) r_1(t_i)\right].$$

$p(z_i|\text{path 2 is true}, z_{i-1})$ is similarly computed, but with appropriate changes that will be evident to those skilled in the art from a study of the equations above.

In the above equations, $r_1$ is a residual associated with Kalman filter 32 using path 1, and $$S_1(t_i)=H_1(t_i)P_1^-(t_i)H_1^T(t_i)+R_1(t_i);$$

where:

$H_1(t_i)$ is a measurement correction matrix;

$P_1^-(t_i)$ is a state error covariance matrix; and $R_1$ is a noise covariance matrix associated with each measurement.

Path hypothesis testing portions 28 and 30 are initialized so that $p_1(t_0)=p_2(t_0)=\frac{1}{2}$. Probabilities $p_1(t_i)$ and $p_2(t_i)$ are determined recursively as train 10 moves down the path. Depending upon which path is taken, the probability representing the path actually taken approaches 1, while the other probability approaches 0. For example, if path 1 (i.e., path 20) is taken by train 10, $p_1(t_i)$ approaches 1, whereas $p_2(t_i)$ approaches 0.

Figure 4:
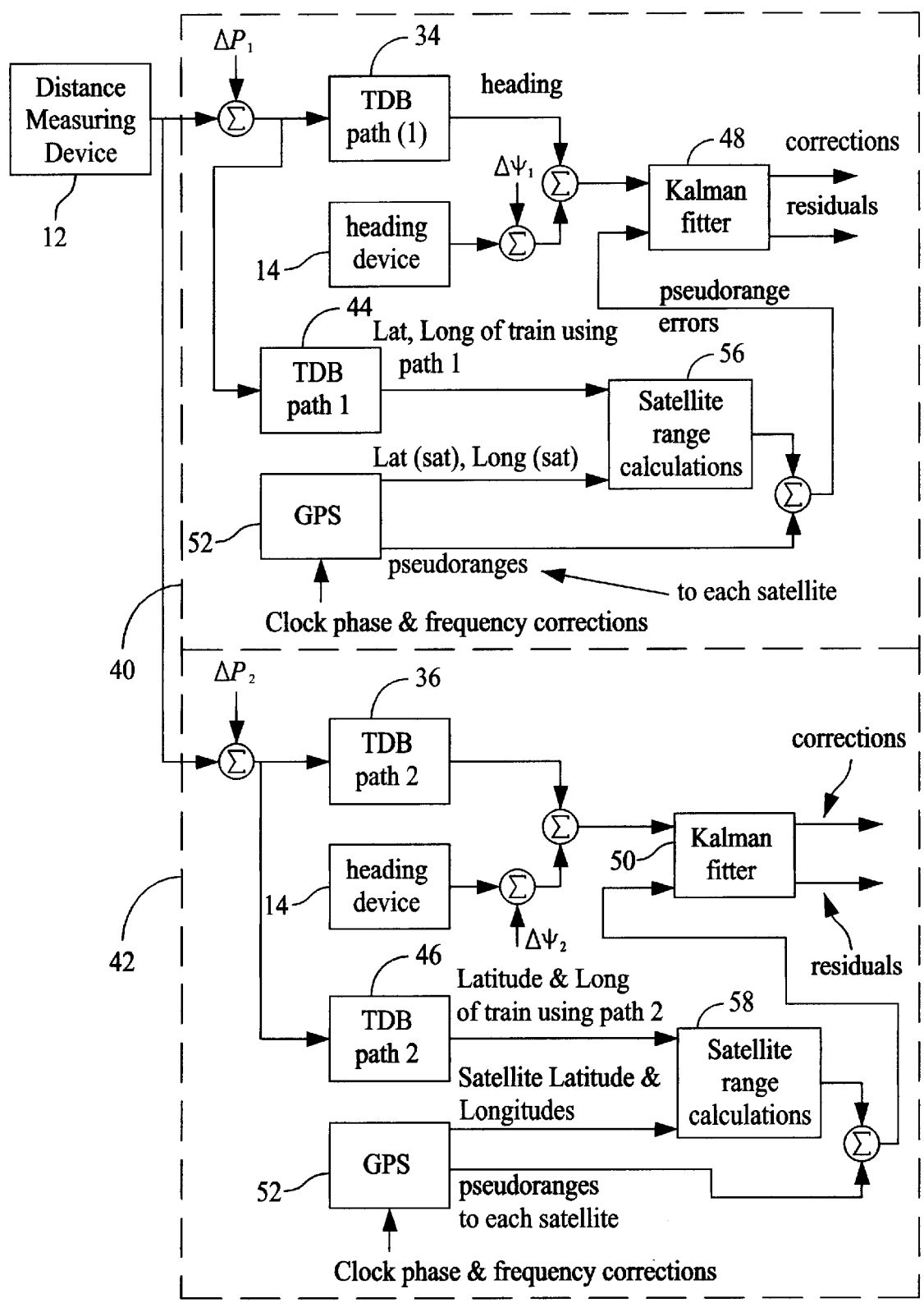
FIG. 4 is a block diagram of an embodiment of a path determining device of the present invention utilizing heading, distance, and pseudorange information.

A block diagram of an embodiment in which some further improvement is provided by use of a GPS receiver providing satellite positions and pseudoranges is shown in FIG. 4. This embodiment is similar to the embodiment represented in FIG. 3, with the following exceptions. In FIG. 4, path databases 44 and 46 each comprises latitude, longitude and heading as a function of distance down their respective paths 20 and 22. Kalman filters 48 and 50 provide, in addition to $\Delta p$ corrections, corrections for clock phases and frequencies of an 8-channel GPS receiver 52. (GPS receiver 52 is shown twice, i.e., once in each hypothesis testing portion 40, 42, for illustrative convenience only.) GPS-computed satellite latitude and longitudes, as well as latitude and longitudes of train 10 are input to a satellite range calculator 56, 58 in each hypothesis testing portion 40 and 42, respectively, and outputs of respective satellite range calculators 56, 58 are compared to the pseudoranges output by GPS receiver 52 in each hypothesis testing portion 40, 42. Resulting pseudorange errors are used by Kalman filters 48, 50 to determine their respective corrections and residuals.

Figure 5:
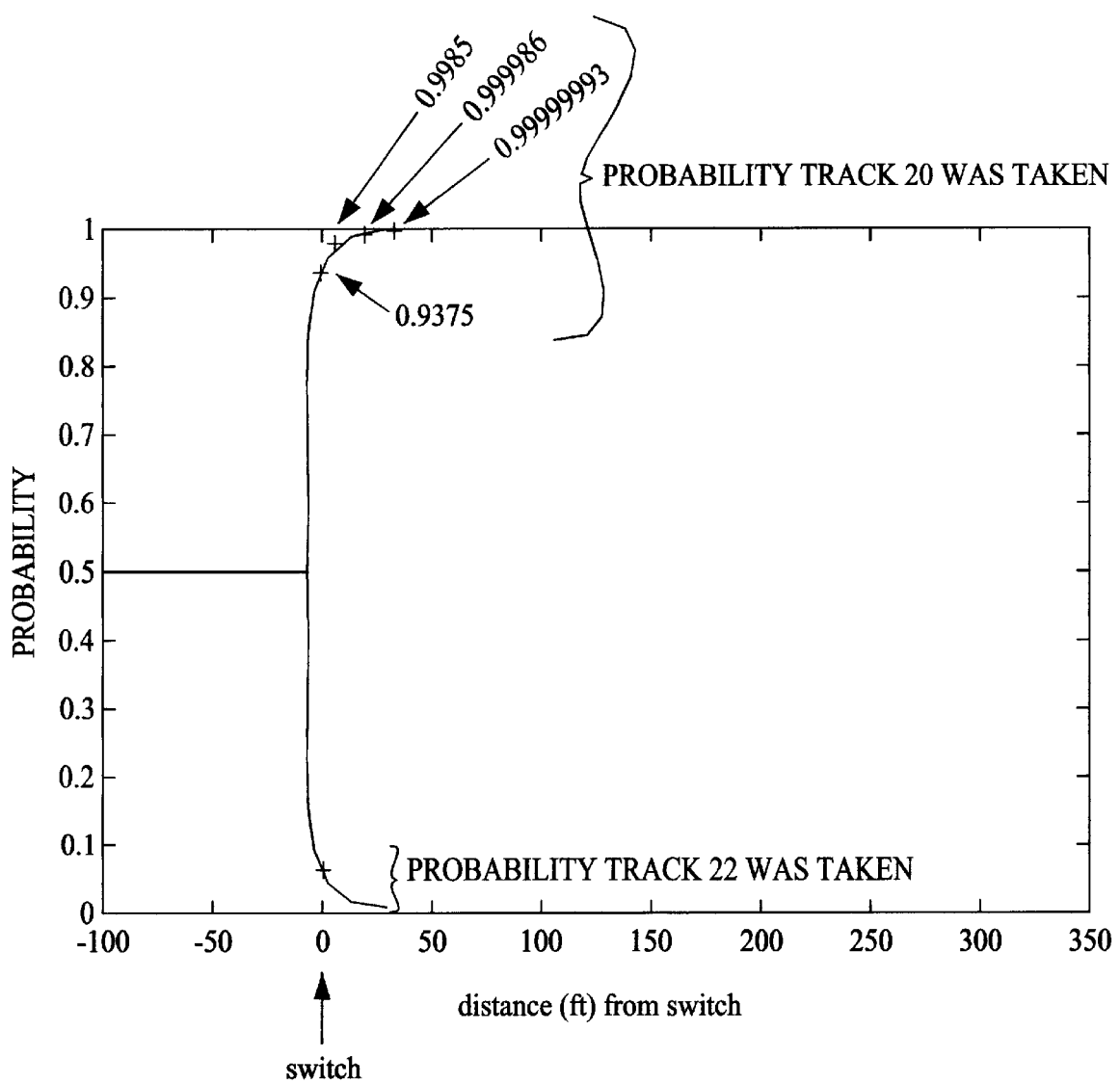
FIG. 5 is a graphical representation of probabilities of a simulation run of an embodiment of a hypothesis testing portion of a path determining device of the present invention.

FIG. 5 is a graphical representation of probabilities output by a simulation run of a hypothesis testing portion 48, for example. Before reaching switch 18, the probability of the train being on the assumed path is set to 0.5. After passing switch 18 and taking the assumed path (path 20, shown in FIG. 2), a computed probability that path 20 was taken rises immediately to 0.9375. Before reaching a point fifty feet beyond switch 18, the probability rises to 0.99999993 that the assumed path was taken. Similarly, the determined probability that path 22 was taken decreases immediately to 0.625 and then approximately zero at a point fifty feet beyond switch 18.

Figure 6:
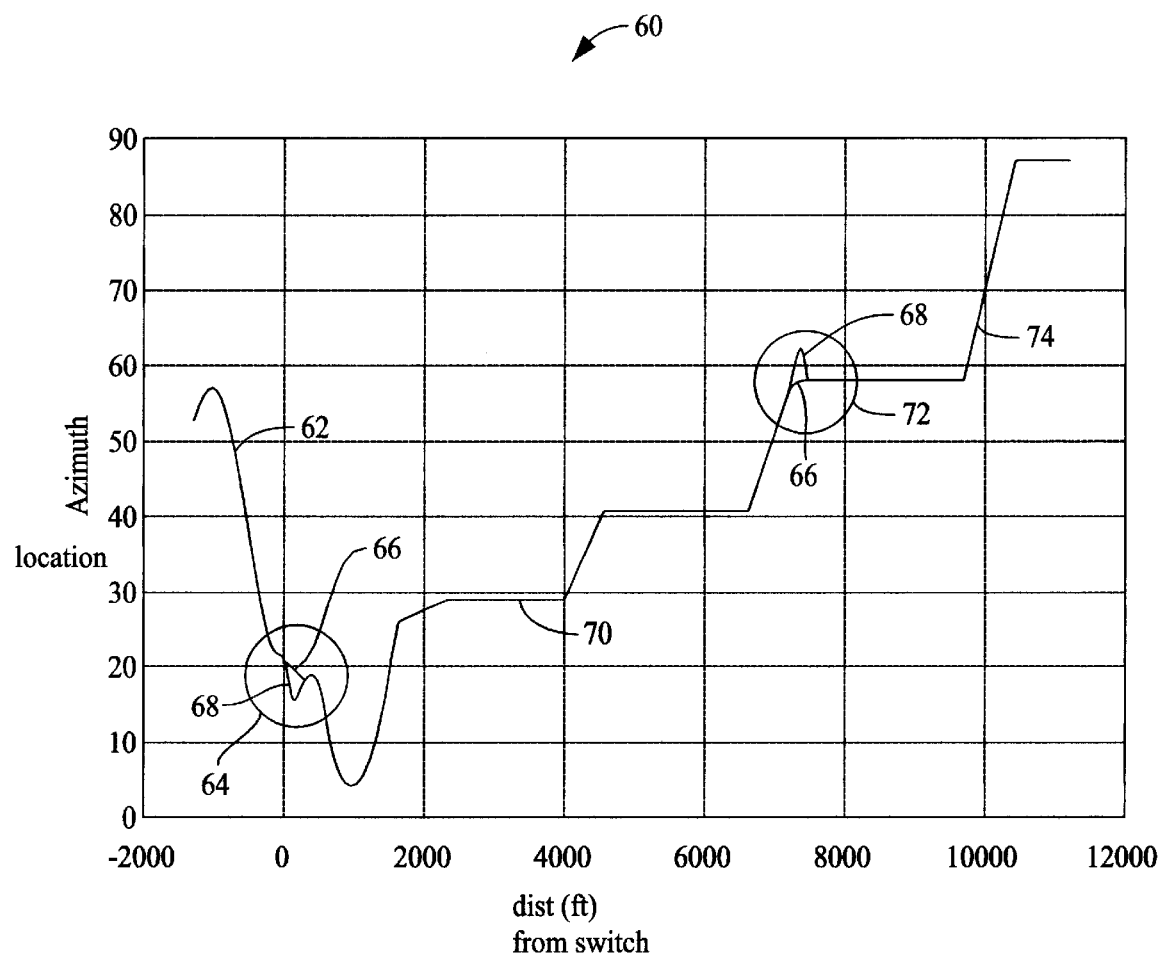
FIG. 6 is a graphical representation of heading information for a typical track having a siding.

FIG. 6 is a graphical representation 60 of a typical path database and siding (turnout). Starting at the left of graphical representation 60, a first single path section 62 approaches a first turnout 64, which commences a first path section 66 and a second path section 68. A double path section 70 extends from first turnout 64 to a second turnout 72 which terminates double path section 70 and commences a second single path section 74. In an alternative embodiment double path 70 is a multi path section including more than two paths.

It should be understood that the above described system may be utilized to detect which path of any number of paths has been taken.

From the preceding description of various embodiments of the present invention, it is evident that a determination of whether a locomotive takes a turnout is accomplished quickly and with a high level of certainty. The above described system may be utilized with any type of vehicle such as an automobile, truck, boat, plane, etc. operating in water, air, and/or ground including a roadway. Furthermore, by employing a Kalman filter, more robust determinations are possible because threshold criteria are based on more measurement data than is used in systems employing detection of curvature alone. Other types of filters may be utilized in addition to or instead of a Kalman filter. For example, a Least-squares estimator, an estimator, a Maximum-likelihood estimator and an Extended Kalman filter, as known to those skilled in the art, may be utilized. In regard to the multiple Kalman filters that are used for turn out detection, such multiple filters may be configured as an optimal Bayesian adaptive estimator.

Although particular embodiments of the invention have been described and illustrated in detail, it is to be clearly understood that the same is intended by way of illustration and example only and is not to be taken by way of limitation. Accordingly, the spirit and scope of the invention are to be limited only by the terms of the appended claims and legal equivalents.

What is claimed is:

1. A path determination device configured to:

receive measured heading and distance information;

determine heading corrections, distance corrections, and residuals utilizing a signal assuming a selected, known path was taken; and determine a probability that the selected, known path actually was taken utilizing the determined residuals.

2. A device in accordance with claim 1 further configured to receive measured satellite positions and pseudorange information, determine satellite position and pseudorange corrections utilizing a processor, and utilize the satellite position and pseudorange measurements in conjunction with the measured heading and distance information to determine the residuals.

3. A device in accordance with claim 1 configured to determine heading corrections, distance corrections, and residuals for at least two different selected known paths from the same heading and distance information.

4. A device in accordance with claim 1 configured to determine heading corrections, distance corrections, and residuals utilizing a filter assuming a selected, known path was taken.

5. A device in accordance with claim 4 wherein said filter is a Kalman filter.

6. A device in accordance with claim 1 configured to determine a most probable path using $p_1(t)=\text{prob}\{\text{path 1 is true}|z(t_i)=z_i\}$ where $z_i$ is the measurement vector, i.e., $z_i=[\Delta\psi](t_i)$, and $\Delta\psi$ is the heading error.

7. A device in accordance with claim 6 further configured to use a global position satellite receiver to determine a path most probable to have been taken, where $$p_j(t_i) = \frac{p(z_i \mid \text{path } 1, z_{i-1}) p_j(t_{i-1})}{p(z_i \mid \text{path } 1, z_{i-1}) p_1(t_{i-1}) + p(z_i \mid \text{path } 2, z_{i-1}) p_2(t_{i-1})}, \; j = 1, 2$$

and $$p(z_i \mid \text{path } 1 \text{ is true}, z_{i-1}) = \frac{1}{(2\pi)^{n/2} [\det(S_1(t_i))]^{1/2}} \exp\left[-\frac{1}{2} r_1^T S_1^{-1}(t_i) r_1(t_i)\right]$$

where $r_1$ is a residual associated with a first path Kalman filter and $$S_1(t_i) = H_1(t_i) P_1^-(t_i) H_1^T(t_i) + R_1(t_i);$$

where $H_1(t_i)$ is a measurement correction matrix;

$P_1^-(t_i)$ is a state error covariance matrix; and $R_1$ is a noise covariance matrix associated with each measurement.

8. A device in accordance with claim 7 further configured so that $p_1(t_0) = p_2(t_0) = \frac{1}{2}$ at initialization.

9. A device in accordance with claim 1 further configured to determine probabilities $p_1(t_i)$ and $p_2(t_i)$ recursively as a vehicle moves down the path.

10. A device in accordance with claim 9 wherein said vehicle is at least one of a locomotive, automobile, boat, and airplane.

11. A method for determining a path taken after a turnout, said method comprising the steps of:

receiving measured heading and distance information;

determining heading corrections, distance corrections, and residuals; and determining a probability that the selected, known path actually was taken utilizing the determined residuals.

12. A method in accordance with claim 11 wherein said step of determining heading corrections, distance corrections, and residuals further comprises the step of utilizing a filter assuming a selected, known path was taken.

13. A method in accordance with claim 12 further comprising the steps of:

receiving measured satellite positions and pseudorange information;

determining satellite position and pseudorange corrections utilizing the filter; and utilizing the satellite position and pseudorange measurements in conjunction with the measured heading and distance information to determine the residuals.

14. A method in accordance with claim 11 further comprising the step of determining heading corrections, distance corrections, and residuals for two different selected known paths from the same heading and distance information.

15. A method in accordance with claim 11 further comprising the step of determining a most probable path using $p_1(t) = \text{prob}\{\text{path } 1 \text{ is true} \mid z(t_i) = z_i\}$ where $z_i$ is the measurement vector, i.e., $z_i = [\Delta\psi](t_i)$, and $\Delta\psi$ is the heading error.

16. A method in accordance with claim 15 further comprising the step of using a GPS receiver to determine a most probable path, where $$p_j(t_i) = \frac{p(z_i \mid \text{path } 1, z_{i-1}) p_j(t_{i-1})}{p(z_i \mid \text{path } 1, z_{i-1}) p_1(t_{i-1}) + p(z_i \mid \text{path } 2, z_{i-1}) p_2(t_{i-1})}, \; j = 1, 2$$

and $$p(z_i \mid \text{path } 1 \text{ is true}, z_{i-1}) = \frac{1}{(2\pi)^{n/2} [\det(S_1(t_i))]^{1/2}} \exp\left[-\frac{1}{2} r_1^T S_1^{-1}(t_i) r_1(t_i)\right]$$

where $r_1$ is a residual associated with a first path Kalman filter and $$S_1(t_i) = H_1(t_i) P_1^-(t_i) H_1^T(t_i) + R_1(t_i);$$

where $H_1(t_i)$ is a measurement correction matrix;

$P_1^-(t_i)$ is a state error covariance matrix; and $R_1$ is a noise covariance matrix associated with each measurement.

17. A method in accordance with claim 16 wherein said step of using a GPS receiver to determine a most probable path further comprises the step of configuring the GPS receiver such that $p_1(t_0) = p_2(t_0) = \frac{1}{2}$ at initialization.

18. A method in accordance with claim 11 further comprising the step of determining probabilities $p_1(t_i)$ and $p_2(t_i)$ recursively as the vehicle moves down the path.

19. A system for determining a path taken after a turnout, said system comprising:

a distance measuring device;

a heading measuring device;

a path database; and a processor configured to access said path database, said processor further configured to determine a probability that a selected, known path actually was taken utilizing determined residuals.

20. A system according to claim 19 wherein said processor further configured to:

receive measured heading information from said heading measuring device;

receive measured distance information from a distance measuring device;

determine heading corrections, distance corrections, and residuals; and determine a probability that a selected, known path actually was taken utilizing said determined residuals.

21. A system in accordance with claim 20 wherein said processor is further configured to assume a selected, known path was taken when determining heading corrections, distance corrections, and residuals.

22. A system in accordance with claim 21 wherein said processor further configured to:

receive measured satellite position and pseudorange information;

determine satellite position and pseudorange corrections utilizing a filter; and utilize the measured satellite position and pseudorange measurements in conjunction with the measured heading and distance information to determine the residuals.

23. A system in accordance with claim 20 wherein said processor further configured to determine heading corrections, distance corrections, and residuals for two different selected known paths from the same heading and distance information.

24. A system in accordance with claim 20 wherein said processor further configured to determine a most probable path using $p_1(t) = \text{prob}\{\text{path } 1 \text{ is true} \mid z(t_i) = z_i\}$ where $z_i$ is the measurement vector, i.e., $z_i = [\Delta\psi](t_i)$, and $\Delta\psi$ is the heading error.

25. A system in accordance with claim 24 further comprising a GPS receiver and wherein said processor further configured to use information from said GPS receiver to determine which path is most probable, where $$p_j(t_i) = \frac{p(z_i \mid \text{path } 1, z_{i-1})p_j(t_{i-1})}{p(z_i \mid \text{path } 1, z_{i-1})p_1(t_{i-1}) + p(z_i \mid \text{path } 2, z_{i-1})p_2(t_{i-1})}, j = 1, 2$$

and $$p(z_i \mid \text{path 1 is true}, z_{i-1}) = \frac{1}{(2\pi)^{n/2}[\det(S_1(t_i))]^{1/2}} \exp\left[-\frac{1}{2}r_1^T S_1^{-1}(t_i)r_1(t_i)\right]$$

where $r_1$ is a residual associated with a first path Kalman filter and $$S_1(t_i) = H_1(t_i)P_1^-(t_i)H_1^T(t_i) + R_1(t_i);$$

where
- $H_1(t_i)$ is a measurement correction matrix;
- $P_1^-(t_i)$ is a state error covariance matrix; and
- $R_1$ is a noise covariance matrix associated with each measurement.

26. A system in accordance with claim 25 wherein said GPS receiver further configured such that $p_1(t_0) = p_2(t_0) = \frac{1}{2}$ at initialization to determine which path is most probable.

27. A system in accordance with claim 19 wherein said processor further configured to determine probabilities $p_1(t_i)$ and $p_2(t_i)$ recursively as a vehicle moves down the path.

* * * * *